United States Patent
Väisänen et al.

[11] Patent Number: 6,009,337
[45] Date of Patent: Dec. 28, 1999

[54] METHOD AND ARRANGEMENT FOR INTERFERENCE-PROTECTED POWER SUPPLY

[75] Inventors: Hannu Väisänen, Jääli; Tarmo Mettovaara; Kari Saukko, both of Oulu, all of Finland

[73] Assignee: Nokia Telecommunications Oy, Espoo, Finland

[21] Appl. No.: 08/875,057

[22] PCT Filed: Oct. 30, 1996

[86] PCT No.: PCT/FI96/00580

§ 371 Date: Jul. 1, 1997

§ 102(e) Date: Jul. 1, 1997

[87] PCT Pub. No.: WO97/16937

PCT Pub. Date: May 9, 1997

[30] Foreign Application Priority Data

Nov. 2, 1995 [FI] Finland .................................. 955268

[51] Int. Cl.[6] .................................................. H04B 1/10
[52] U.S. Cl. .................................... 455/572; 455/298
[58] Field of Search ................................ 455/80, 83, 572, 455/78, 133, 63, 296, 298; 333/12

[56] References Cited

U.S. PATENT DOCUMENTS

| 3,662,294 | 5/1972 | Jacobs et al. .............................. 333/33 |
| 4,525,863 | 7/1985 | Stites . |
| 5,387,886 | 2/1995 | Takalo et al. ............................ 370/280 |
| 5,603,098 | 2/1997 | Kwan ......................................... 455/83 |
| 5,630,213 | 5/1997 | Vannatta .................................. 455/133 |
| 5,768,691 | 6/1998 | Matero et al. ............................. 455/78 |
| 5,768,692 | 6/1998 | Kwak ......................................... 455/83 |
| 5,784,687 | 7/1998 | Itoh et al. .................................. 455/78 |
| 5,867,778 | 2/1999 | Khoury et al. ........................... 455/333 |

FOREIGN PATENT DOCUMENTS

| 0596727 | 5/1994 | European Pat. Off. . |
| 08204421 | 8/1996 | Japan . |

Primary Examiner—David R. Hudspeth
Assistant Examiner—Martin Lerner
Attorney, Agent, or Firm—Pillsbury Madison & Sutro

[57] ABSTRACT

The invention relates to an interference-protected method and arrangement for supplying power, wherein the power supply between main devices and a masthead preamplifier of a base station in a cellular radio system takes place through an antenna line, and overvoltage formed on the antenna line is conducted to the ground by means of an overvoltage protector adapted for radio frequencies. The use of separate cables and separate overvoltage protector for the supply cable is thus avoided.

9 Claims, 1 Drawing Sheet

METHOD AND ARRANGEMENT FOR INTERFERENCE-PROTECTED POWER SUPPLY

This application is the national phase of international application PCT/FI96/00580, filed Oct. 30 1996 which was designated the U.S.

FIELD OF THE INVENTION

The invention relates to an interference-protected method for supplying power to a receiver in a cellular radio system, said method being employed at a base station in a cellular radio system, said base station comprising main devices, peripheral devices, and an antenna line between the main devices and the peripheral devices, said main devices comprising at least a power supply and an antenna filter, and said peripheral devices comprising at least a masthead amplifier.

The invention also relates to an interference-protected arrangement for supplying power to a receiver at a base station of a cellular radio system, said base station comprising main devices, peripheral devices, and an antenna line between the main devices and the peripheral devices, said main devices comprising at least a power supply and an antenna filter, and said peripheral devices comprising at least a masthead amplifier.

BACKGROUND OF THE INVENTION

A base station of a cellular radio system comprises an antenna, and transmitter and receiver means. Since radio frequencies are rapidly attenuated, distorted and disturbed in conductors, the received signal is usually amplified as close to the antenna as possible. For this purpose, a masthead preamplifier, which is a peripheral device of a base station, is employed in the immediate vicinity of an antenna which is included in a base station of a cellular radio system and which is usually located in terrain. The main devices of a base station comprise, for example, one or more power supplies for supplying power to the devices included in the base station. The power supply of a masthead preamplifier is typically implemented with low-frequency alternating current or with direct current by means of a separate power supply cable between a power supply included in the main devices of a base station and a masthead preamplifier. The power supply cable is protected by a separate, conventional overvoltage protector. It is laborious to mount a power supply cable between the main devices of a base station and a masthead preamplifier. Costs result from both the installation work and the cable itself. In addition, the overvoltage protector required by the power supply cable often cannot be sufficiently well implemented and causes extra work and costs.

CHARACTERISTICS OF THE INVENTION

The object of the present invention is to provide power supply for a base station in such a way that the installation of a separate power supply cable is avoided and the overvoltage protection is improved.

This is achieved with a method of the type described in the introduction, which is characterized by supplying operational voltage from a main device to a peripheral device of the base station through the antenna line, separating the operational voltage supplied on the antenna line and a signal from the antenna from each other in a peripheral device by filtering, and conducting overvoltage formed on the antenna line to the ground through a ¼ wave length impedance matching stub operating on the radio frequencies used by the base station.

The power supply arrangement of the invention is characterized in that the antenna line is arranged to supply operational voltage from the main devices to the peripheral devices, the peripheral device comprises filter means for separating operational voltage supplied to the antenna line and a signal from the antenna from each other, and the ¼ wave length impedance matching stub operating on the radio frequencies employed by the base station is arranged to conduct overvoltages to the ground.

The method of the invention has significant advantages. The solution of the invention allows the number of cables to be reduced, whereby a smaller number of components are needed in the overvoltage protection and the overvoltage protection is enhanced. This reduces the overall costs.

BRIEF DESCRIPTION OF THE DRAWINGS

In the following, the invention will be described in greater detail with reference to the examples illustrated in the accompanying drawings, in which.

DESCRIPTION OF PREFERRED EMBODIMENTS

Figure 1:
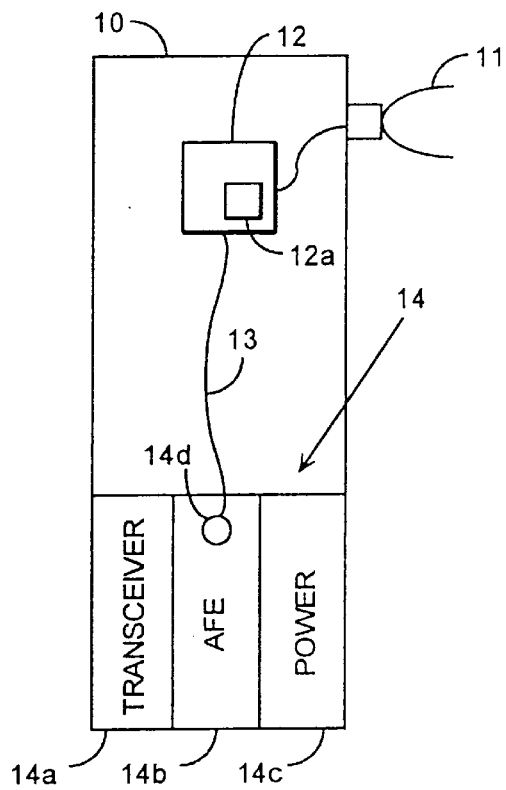
FIG. 1 shows the general structure of a base station in a cellular radio system.

FIG. 1 shows a typical structure of a base station in a cellular radio system. The base station 10 comprises an antenna 11, a peripheral device 12, an antenna line 13, a main device 14 comprising various parts 14a such as transmitter and receiver blocks, an antenna filter 14b and a power supply 14c of the base station. The antenna filter 14b comprises a main device connector 14d, to which the antenna line 13 is connected. In the case of the present invention, the peripheral device 12 is a masthead preamplifier. The operation of the base station 10—which is described herein only from the point of view of reception—connects parts 11 to 14d to each other in the following manner. After the antenna 11 has received a transmitted signal, which may be very weak, the signal is supplied from the antenna to the preamplifier 12. The preamplifier 12 should be as close to the antenna 11 as possible to prevent the signal from being further weakened. For this reason and because a base station often comprises an antenna mast of some kind, the preamplifier 12 is mounted in the antenna mast. From the preamplifier 12, the signal is forwarded to the antenna filter 14b and from there to further processes. The power used by the various devices 12–14b in the base station 10 is obtained from the power supply 14c.

Figure 2:
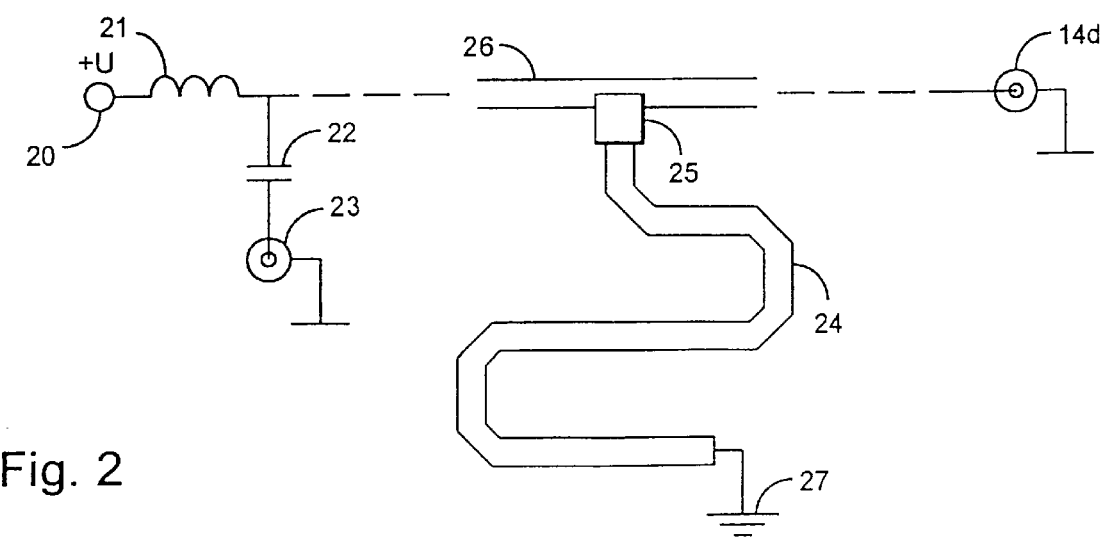
FIG. 2 shows an example of the operable coupling of the overvoltage protector according to the invention.

FIG. 2 shows an example of an overvoltage protector of power supply in the solution of the invention. The arrangement for overvoltage protection comprises a preamplifier 12, an input terminal 20 of operational voltage, a radio frequency choke 21, a high-pass filter 22, a receiver connector 23, a component 25 whose electroconductivity changes as a function of voltage, a microstrip line 26, ground 27 of the base station and a main device connector 14d for the base station. Parts 14d and 20 to 26 are operationally coupled to one another as follows. The antenna line 13 is connected to the main device connector 14d. From the antenna line 13, a received signal is supplied through the main device connector 14d to the microstrip line 26, from which it continues further via the high-pass filter 22 and the receiver connector 23 to the receiver. The microstrip line 26 connects the main device connector 14d, to which the antenna line 13 leads, and the receiver connector 23. The microstrip line 26 is typically a conductor which is provided with a uniform ground plane and located on top of an insulator and which guides the propagation of electromagnetic radiation. The radio frequency choke 21 prevents the propagation of the signal to the power supply through the terminal 20.

In the event of interference, overvoltage is generated on the antenna line 13; the overvoltage propagates in the same way as a signal to the microstrip line 26. In the microstrip line 26, however, the overvoltage is discharged through the overvoltage protector 24, 25 to the ground 27, and thus it does not propagate to the connector 23 nor to the further processes in the receiver.

In the following, the solution of the invention will be studied more closely with reference to FIGS. 1 and 2. In the solution of the invention, electric power is supplied from a main device 14 of a base station 10 to a peripheral device 12 via an antenna line 13. Overvoltage generated on the antenna line 13 by the action of lightning, for example, is supplied in the solution of the invention to the ground 27 by connecting an impedance matching stub 24 between the antenna line 13 and the ground 27 to serve as an overvoltage protector. The impedance matching stub 24 operates on the radio frequencies used by the base station 10, and its length is $\lambda/4 + n*\lambda/2$, where $\lambda$ is the wavelength, and n is an integer, and n $\in$ [0, 1, 2, . . . ]. In the receiver of the base station 10, it is always necessary to use an antenna line 13 between the main device and the antenna 11. Since the power supply of a peripheral device 12 located in the vicinity of the antenna 11 takes place through the antenna line 13, no separate power supply cable is needed, which is an advantage. The peripheral device 12 comprises filter means 12a for separating the power supply intended as operational voltage from a high-frequency signal containing information. The operational voltage enables the operation of the preamplifier 12 and the filters included in it. These filter means 12a for separating operational voltage and a signal from each other are filters that operate on radio frequencies and are assembled from integrated circuits or separate components. The operational voltage in the solution of the invention is of low-frequency, typically clearly below 1 kHz, or of direct current. There is no specific limit for the frequency of the operational voltage; however, the frequency band of the operational voltage must be separable by existing filtering methods from interference and from a signal whose frequency is typically at least dozens of megahertzes. Overvoltage caused by lightning, for example, has a broad frequency band; for this reason, the operational voltage should preferably be either normal voltage of network frequency or direct voltage, in which case power supply would have a narrow band, which reduces the amount of interference in the power supply.

The main device 14 of the base station comprises a microstrip line 26 which connects the antenna line and the receiver; radio-frequency radiation propagates along the microstrip line, and the antenna line 13 is operationally coupled thereto. Between a first end of the impedance matching stub 24 and the microstrip line 26, there is provided a component 25 which changes its electroconductivity as a function of voltage. If the overvoltage protector consists merely of the impedance matching stub 24, direct voltage cannot be used in the power supply of the masthead preamplifier 12, since the impedance matching stub 24 would then form a short circuit from the microstrip line 26 to the ground. To allow direct-current power supply, the component 25 which changes its electroconductivity as a function of voltage is employed between the impedance matching stub 24 and the microstrip line 26. Under normal operating conditions, without any overvoltage on the antenna line 13 and the microstrip line 26, the impedance of the component 25 is so high that no significant amount of current is conducted through it to the ground 27 of the base station. When the interference voltage increases in the microstrip line 26, the conductivity of the component 25 increases, and the interfering overvoltage is conducted to the ground 27.

The component 25 which changes its electro-conductivity as a function of voltage is preferably a varistor which operates in a typically non-linear manner: as the voltage grows in the microstrip line 26 such that it exceeds a predetermined threshold value, the impedance of the varistor 25 falls abruptly from its normal, very high value and becomes very low, whereby the high interference voltage is conducted to the ground 27 of the base station. The normal impedance of the varistor 25 is over 10 megaohms, but with high voltages it falls below 100 ohms. The impedance change typically takes place in 10 microseconds with great voltage variations. To conduct overvoltage to grounds as rapidly as this does not disturb transition of speech, for example, since a human being cannot perceive short interruptions. Moreover, particularly in a digital cellular radio system, error correction can further reduce the interference caused by a short interruption. The component 25 which changes its electroconductivity as a function of voltage can also be a zener diode which is preferably a bidirectional protective zener which gives the same protective properties as the varistor.

The overvoltage protector of the invention is integrated into the unit to be protected in the base station. Typically the protector cuts off overvoltages between ±50 V to 200 V, which is a lower level than what is achieved with the known commercial solutions. The protector conducts a current of the magnitude 35 A to the ground. The operational voltage U+ is typically a direct voltage of 12 V; in view of sensitive electronic components, it is therefore the better, the lower the overvoltage protection begins. The overvoltage protection can further be enhanced by using—in addition to the overvoltage protector of the invention, which is integrated into the structure—separately installed commercial overvoltage protectors. In this case, the voltage capacity of the protector can be increased to over 200 V, particularly to provide protection against a high-energy overvoltage pulse; at the same time, the magnitude of the interference current conducted to the ground may grow even up to 40 kA. When the solution of the invention is used in conjunction with a commercial overvoltage protector, it protects the devices of a base station against a residual pulse of a high-energy pulse. The operating range of 'primary protectors' of commercial overvoltage protectors is from about ±90 V upwards, but even higher residual pulses are possible. Commercial overvoltage protectors and the solution of the present invention complement each other.

Although the invention has been described above with reference to the example illustrated in the drawings, it will be clear that the invention is not limited to this example, but it can be modified in many ways within the scope of the inventive concept disclosed in the appended claims.

We claim:

1. An interference-protected method for supplying power to a receiver in a cellular radio system, said method being employed at a base station (10) in a cellular radio system, said base station comprising main devices (14), peripheral devices (12), and an antenna line (13) between the main devices (14) and the peripheral devices (12), said main devices (14) comprising at least a power supply (14c) and an antenna filter (14b), and said peripheral devices (12) comprising at least a masthead amplifier, characterized by supplying operational voltage from a main device (14) to a peripheral device (12) of the base station through the antenna line (13), separating the operational voltage supplied on the antenna line (13) and a signal from an antenna (11) from each other in a peripheral device (12) by filtering (12a), and conducting overvoltage formed on the antenna line (13) to the ground (27) through a component (25) which changes its impedance as a function of voltage, and through an impedance matching stub (24) which is connected thereto and operates on the radio frequencies used by the base station (10).

2. A method according to claim 1, characterized in that, as a main device (14) of the base station (10) comprises a microstrip line (26) which connects the antenna line (13) and a receiver block (14a) and to which the antenna line (13) is operationally coupled, overvoltage formed on the antenna line (13) is conducted to the ground (24) through a component (25) which is connected to the microstrip line (26) and which changes its impedance as a function of voltage, and through an impedance matching stub connected thereto.

3. A method according to claim 1, characterized in that the length of the impedance matching stub (24) is $\lambda/4+n*\lambda/2$, where $\lambda$ is the wavelength, and n is an integer.

4. An interference-protected arrangement for supplying power to a receiver at a base station (10) of a cellular radio system, said base station comprising main devices (14), peripheral devices (12), and an antenna line (13) between the main devices (14) and the peripheral devices (12), said main devices (14) comprising at least a power supply (14c) and an antenna filter (14b), and said peripheral devices (12) comprising at least a masthead amplifier, characterized in that the antenna line (13) is arranged to supply operational voltage from the main devices (14) to the peripheral devices (12), one peripheral device (12) comprises filter means (12a) for separating operational voltage supplied to the antenna line (13) and a signal from the antenna (11) from each other, and an impedance matching stub (24) operating on the radio frequencies employed by the base station (10) and a component (25) which changes its electroconductivity as a function of voltage are arranged to conduct overvoltages to the ground (27).

5. A power supply arrangement according to claim 4, characterized in that, as a main device (14) of the base station (10) comprises a microstrip line (26) to which the antenna line (13) is operationally coupled, a component (25) which changes its electroconductivity as a function of voltage is arranged to be connected between a first end of the impedance matching stub (24) and the microstrip line (26).

6. A power supply arrangement according to claim 4, characterized in that the length of the impedance matching stub (24) is $\lambda/4+n*\lambda/2$, where $\lambda$ is the wavelength, and n is an integer.

7. A power supply arrangement according to claim 4, characterized in that the component (25) which changes its electroconductivity as a function of voltage is a varistor.

8. A power supply arrangement according to claim 4, characterized in that the component (2) which changes its electroconductivity as a function of voltage is a zener diode.

9. A power supply arrangement according to claim 4, characterized in that the zener diode is a bidirectional protective zener diode.

* * * * *